No. 772,498. PATENTED OCT. 18, 1904.
J. W. CHAPMAN & G. W. KOOMAN.
COFFEE OR TEA POT.
APPLICATION FILED APR. 13, 1904.
NO MODEL.
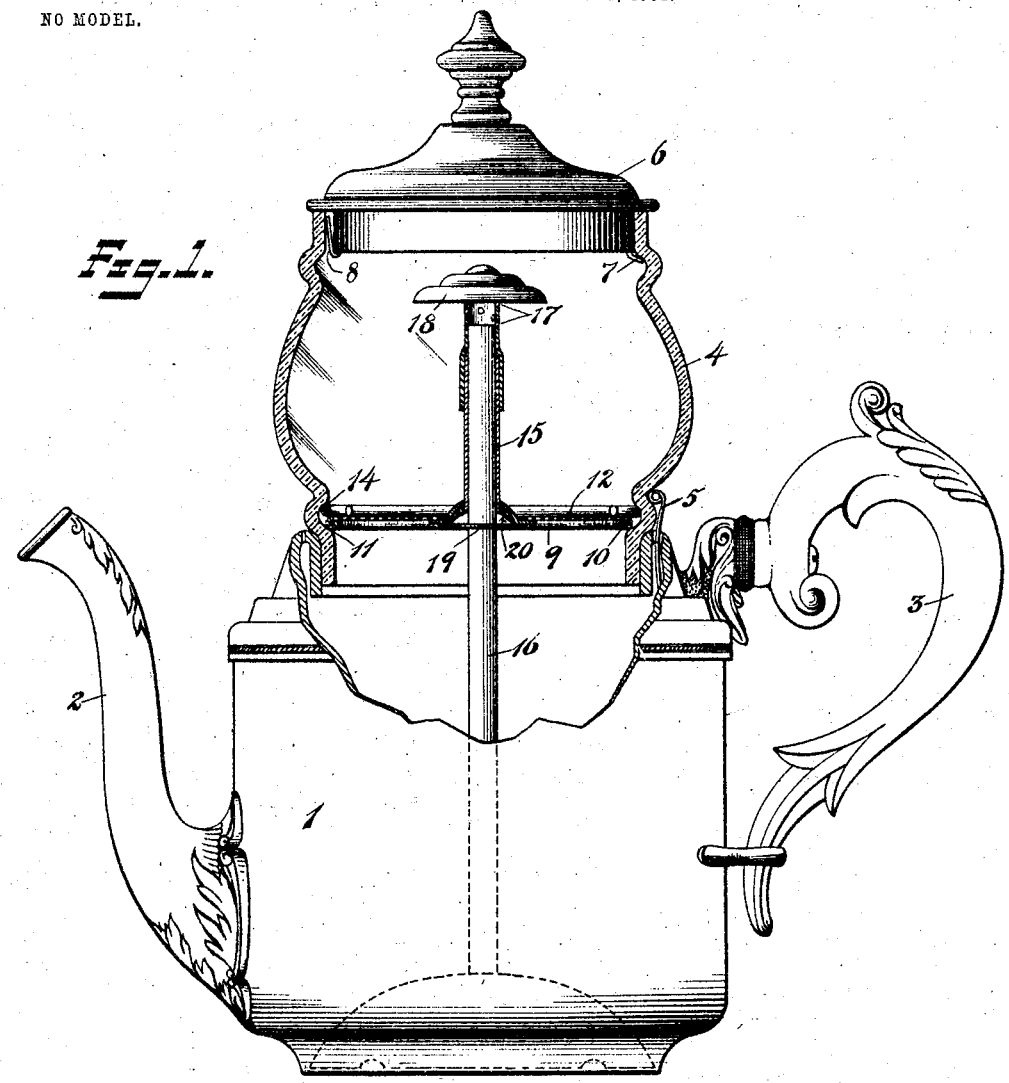
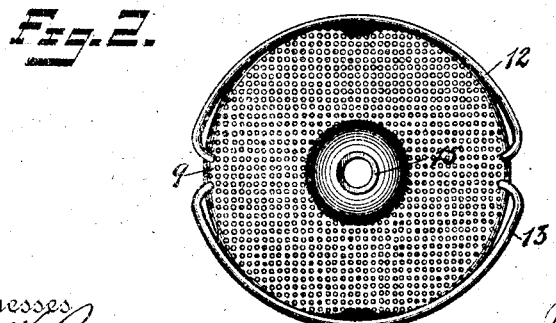

No. 772,498. Patented October 18, 1904.

UNITED STATES PATENT OFFICE.

JAMES W. CHAPMAN AND GEORGE W. KOOMAN, OF MERIDEN, CONNECTICUT, ASSIGNORS TO MANNING, BOWMAN & COMPANY, OF MERIDEN, CONNECTICUT, A CORPORATION OF CONNECTICUT.

COFFEE OR TEA POT.

SPECIFICATION forming part of Letters Patent No. 772,498, dated October 18, 1904.

Application filed April 13, 1904. Serial No. 202,936. (No model.)

*To all whom it may concern:*

Be it known that we, JAMES W. CHAPMAN and GEORGE W. KOOMAN, citizens of the United States, residing at Meriden, in the county of New Haven, State of Connecticut, have invented certain new and useful Improvements in Coffee or Tea Pots, of which the following is a full, clear, and exact description.

Our invention relates to improvements in coffee and tea pots, and particularly to a type known as "percolators."

The object of our invention is to construct a coffee or tea pot of the percolating class in such a manner that the parts may be assembled or disassembled readily for the purpose of cleaning them or of replacing any part which may by accident become injured.

It is also our object to hold the parts together in such a way that they may not become accidentally disengaged.

The invention consists in a coffee or tea pot having a receptacle for the seasoning element, such as coffee or tea, and in which a perforated screen or strainer forming the bottom of the receptacle is yieldingly held in place by means of springs, so that it will not become accidentally displaced, but may be removed when desired. A percolating-tube extends upward through the center of this strainer for conveying the liquid which is to percolate through the seasoning element.

The invention relates particularly to improvements in a machine of the character shown in the Savage-Hope patent, No. 752,113, of February 16, 1904, as will be seen from an inspection of the accompanying single sheet of drawings.

Figure 1 is a side elevation of the coffee or tea pot embodying the improvements of our invention, the receptacle and strainer being shown in cross-section and a portion of the fluid-holding reservoir broken away. Fig. 2 is a plan view of the strainer, showing the springs which constitute the means for holding the strainer in place in the receptacle.

1 is the body of the coffee or tea pot constituting the fluid-holding reservoir. 2 is a suitable spout. 3 is a suitable handle. These parts are usually constructed of metal.

4 is the receptacle for the seasoning element, such as coffee, tea, &c. This receptacle is preferably constructed of glass and has a flange at the lower edge which fits nicely within the top of the fluid-reservoir.

5 is a spring-finger carried by the reservoir 1 and engaging the receptacle 4 for preventing their accidental disengagement.

6 is the removable top of the receptacle, having a lug 7 and a spring-finger 8 for holding it from accidental disengagement.

9 is a strainer forming the bottom of the receptacle 4, upon which the seasoning element rests and through which the fluid percolates. The edge of this strainer is preferably reinforced by a wire 10.

11 is a shoulder formed in the receptacle 4, upon which the rim of the strainer 9 rests.

12 and 13 are springs carried by the strainer 9 and secured thereto about midway of their ends. The ends are bent inwardly and the springs normally have a position as shown in Fig. 2 when disengaged from the receptacle.

14 is a shoulder formed in the receptacle 4 a short distance above the shoulder 11 and preferably of a slightly-larger inner diameter, the parts being so collocated that the strainer and retaining-springs have the proper amount of play for engaging and disengaging the strainer and springs with and from the receptacle.

15 is a sleeve carried by the strainer.

16 is a percolator-tube through which the fluid is forced upward.

17 is a perforated deflector-tube.

18 is a deflector.

19 is a shoulder carried by the percolator-tube 16, which engages the under side of the strainer structure. The strainer thus holds the percolator-tube securely in place.

In order that the parts may be readily assembled, a funnel-shaped entrance 20 is provided at the lower end of the sleeve 15, which assists in guiding the tube and strainer onto the tube 16. The springs of this construction being secured to the strainer at points intermediate their ends and having the ends free cause the strainer to be pressed down at four points, so as to securely hold it in place. The proportion and the construction of the parts are such, moreover, that the strainer yieldingly holds the percolator with its bell against the bottom of the reservoir.

The deflector-tube 17 slips over the sleeve 15 and is supported above the percolator-tube 16. When it is desired to take the coffee or tea pot apart, assuming it to be in the position shown in Fig. 1, the top is first removed by simply tilting it to the right. The receptacle may be then removed after releasing the spring 5. When the parts are separated in this order, the strainer 9 with its sleeve 15 and the deflector all slip off from the percolator-tube 16 with the receptacle 4. The deflector or spreader 18 may then be removed from the sleeve 15. This leaves the strainer alone in place in the groove near the bottom of the receptacle 4. The strainer may then be removed, preferably by pressing against the bottom adjacent the ends of the springs at one side of the strainer. This releases the springs from the groove. All the parts are then readily accessible for perfect cleansing, repair, or replacement, as may be necessary.

The particular advantages of our invention are simplicity of construction, the ease of assembling and disassembling, and the general efficiency of operation.

What we claim is—

1. In a percolating-machine of the character described, the combination of a fluid-reservoir, a holding-receptacle, a flat metal strainer forming the bottom of said receptacle said receptacle having a shoulder for supporting said strainer and a second shoulder above the same and a spring engaging said strainer and said second shoulder for holding said strainer yieldingly in place.

2. A percolator of the character described comprising a reservoir, a receptacle, a strainer forming the bottom of said receptacle and a pair of independent springs secured to said strainer and having their adjacent ends bent inwardly for engaging said receptacle for the purpose specified and as described.

Signed at Meriden, Connecticut, this 8th day of April, 1904.

JAMES W. CHAPMAN.
GEORGE W. KOOMAN.

Witnesses:
W. E. GRAHAM,
GEO. W. HOPE.